United States Patent [19]
Baechler et al.

[11] Patent Number: 5,897,907
[45] Date of Patent: Apr. 27, 1999

[54] PROCESS FOR DEGRADING DITERPENES OF COFFEE GROUNDS FOR ANIMAL FOOD

[75] Inventors: Robert Baechler, La Tour-de-Peilz; Pierre Hirsbrunner, Corseaux, both of Switzerland

[73] Assignee: Nestec S.A., Vevey, Switzerland

[21] Appl. No.: 08/914,064

[22] Filed: Jul. 15, 1997

[30] Foreign Application Priority Data

Jul. 16, 1996 [EP] European Pat. Off. .............. 96202015

[51] Int. Cl.$^6$ ................................ A23L 1/20; A23K 1/18
[52] U.S. Cl. ............................................ 426/630; 426/807
[58] Field of Search ................................... 426/630, 432, 426/594, 595, 807

[56] References Cited

U.S. PATENT DOCUMENTS 4,156,031 5/1979 Hamell et al. ........................... 426/541
4,293,581 10/1981 Hirsbrunner et al. .................. 426/630
4,323,514 4/1982 Dieffenbacher ....................... 260/412.3
4,544,567 10/1985 Gottesman ............................. 426/594

OTHER PUBLICATIONS

Derwent Database Abstract, WPI Accession No. 86-140046/198622 XRAM Accession No. C86-059785.

Primary Examiner—Anthony J. Weier
Attorney, Agent, or Firm—Vogt & O'Donnell, LLP

[57] ABSTRACT

Coffee grounds containing diterpenes are added together with and heated with phosphoric acid, hydrochloric acid, or sulfuric acid at a temperature of between 80° C. and 100° C. for a time to degrade the diterpenes, and the product so treated is dried and may be used as a part of an animal food.

12 Claims, No Drawings

PROCESS FOR DEGRADING DITERPENES OF COFFEE GROUNDS FOR ANIMAL FOOD

BACKGROUND OF THE INVENTION

The invention relates to a process for the degradation of diterpenes contained by coffee grounds.

It is known in the state of the art that the value of coffee grounds may be enhanced in animal feed by supplementing the said animal feed at the desired concentration. The problem of coffee grounds are that it contains diterpene esters, such as cafestol, kahweol and isocafestol esters, which are known to be physiologically active. U.S. Pat. No. 4,293,581 already relates to a process for enhancing the value of coffee grounds, in which the said grounds are treated by saponification. The disadvantage of this process is that the diterpenes remain in free but nontoxic form in the mass, which may lead to tendentious interpretations as regards the efficiency of the detoxification process. Moreover, in saponification, the calcium salt used blocks the fatty acids which are therefore no longer available, reducing the nutritional value of the coffee grounds obtained.

SUMMARY OF THE INVENTION

The aim of the present invention is to develop a process for enhancing the value of coffee grounds, in which the diterpenes are really degraded and the fatty acids remain available in the final product obtained.

The present invention relates to a process for the degradation of diterpenes contained by coffee grounds, in which the coffee grounds are subjected to a treatment with an acid chosen from phosphoric acid, hydrochloric acid and sulphuric acid, and the treated grounds are dried and recovered.

The acid used should be fat-soluble, inorganic, cheap and acceptable in the food sector.

The acid used is preferably phosphoric acid because it has the advantage of limiting the risks of corrosion of the plants for the treatment of coffee grounds and it provides a supplement of phosphate.

The reason for the effectiveness of the treatment with an acid is because the furan groups of the three diterpenes mentioned above are sensitive to the protons of inorganic acids. After protonation of the oxygen in furan, the furan functional group is destabilized and tends to combine with other partners, thus causing the disappearance of the diterpenes mentioned.

DETAILED DESCRIPTION OF THE INVENTION

In the present description, all percentages are given by weight.

To achieve good degradation of the diterpenes, the procedure, of the present invention is carried out using a phosphoric acid concentration of between 10 and 30%. The quantity of phosphoric acid is given relative to the dry matter content of the grounds, and coffee grounds normally have a dry matter content of the order of 25%. A phosphoric acid content of less than 10% does not leave sufficient degradation of the diterpenes and a concentration greater than 30% leads to a practically quantitative, but not economical, degradation.

The temperature for the treatment of the coffee grounds is between 80 and 100° C. in a time of between 1 and 2 hours. The diterpenes are truly degraded at the beginning of the reaction and it is therefore unnecessary to excessively prolong the reaction time.

After the reaction with the acid, the treated coffee grounds are dried. This drying is not absolutely essential, but it avoids, during transportation, moving excessively large quantities of water. The drying is preferably carried out to a dry matter content of on the order of 80%.

In a preferred embodiment of the process according to the invention, the coffee grounds are treated at a temperature of 90° C. for one hour with 20% phosphoric acid.

The coffee grounds thus treated are used in animal feed in an amount of 5 to 25% depending on the type of animal to be fed.

Analytical determination of the diterpene content is carried out by neutralizing 10 g of coffee grounds with normal NaOH, and the product is dried on an aluminium plate overnight at 30° C. under reduced pressure. After grinding, 2 g of dry powder are vigorously mixed with 20 ml of acetone. A sample of 20 microliters is taken and deposited on a thin-layer chromatographic plate. The procedure is carried out with a silica gel support and the elution is carried out with a tetrahydrofuran, cyclohexane and formic acid mixture. Densitometric detection is performed with UV radiation at 254 nm and visualization with a copper sulphate-phosphoric acid mixture. The densitometric reading allows a quantitative estimation.

EXAMPLES

The rest of the description is made with reference to the following Comparative Example and an Example in accordance with the present invention.

Comparative Example 40 kg of coffee grounds, having a dry matter content (DM) of 28.14%, are poured into a mixer. The material is heated for 1 hour 15 min at 90° C. with the mixer closed. The mixer is opened and the material is dried to a dry matter content of 79.2%. Quantitative analysis of diterpenes is carried out as mentioned above and a kahweol content of 53.9 and a cafestol content of 62, expressed as mg of diterpenes (esterified), are obtained per g of coffee oil.

Example 40 kg of coffee grounds having a dry matter content of 28.14% are poured into a mixer. 20% (calculated relative to the dry matter content of coffee grounds) of 85% $H_3PO_4$ is added thereto. The temperature of the mixture is increased to 90° C. and it is held for 1 hour with the mixer closed. The lid of the mixer is then removed and the material is dried with the product temperature being set at less than 100° C. The drying is stopped when a dry matter content of 81.51% is achieved. Analysis of diterpenes is carried out as mentioned above. A kahweol content of 10.7 and a cafestol content of 14.7, the contents being expressed as mg of diterpenes (esterified), are obtained per g of coffee oil, which corresponds to a degradation of 81% for the first and 78% for the second.

We claim:

1. A process for treating coffee grounds comprising adding subtances together to obtain a substance mixture, wherein the substances added together and the substance mixture consist essentially of (i) coffee grounds which contain diterpenes and moisture and of (ii) an acid selected from the group consisting of phosphoric acid, hydrochloric acid and sulfuric acid, and heating the substance mixture at a temperature of between 80° C. and 100° C. for a time to degrade the diterpenes to obtain a treated coffee grounds product and then drying the treated product.

2. A process according to claim 1 wherein the acid is phosphoric acid.

3. A process according to claim 2 wherein the phosphoric acid is added and heated with the coffee grounds in an amount, by weight based upon coffee grounds dry matter weight, of between 10% and 30%.

4. A process according to claim 1 or 2 wherein the mixture is heated for from 1 hour to 2 hours.

5. A process according to claim 3 wherein the mixture is heated for from 1 hour to 2 hours.

6. A process according to claim 1 wherein the treated product is dried to a dry matter content on the order of 80%.

7. In a process for preparing an animal food composition wherein the animal food comprises coffee grounds, the improvement comprising preparing the animal food composition with coffee grounds previously treated by a process comprising adding substances together to obtain a substance mixture, wherein the substances added together and the substance mixture consist essentially of (i) coffee grounds which contain diterpenes and moisture and of (ii) an acid selected from the group consisting of phosphoric acid, hydrochloric acid and sulfuric acid, and heating the substance mixture at a temperature of between 80° C. and 100° C. for a time to degrade the diterpenes to obtain a treated coffee grounds product and then drying the treated product.

8. A process according to claim 7 wherein the acid is phosphoric acid.

9. A process according to claim 8 wherein the phosphoric acid is added and heated with the coffee grounds in an amount, by weight based upon coffee grounds dry matter weight, of between 10% and 30%.

10. A process according to claim 7 or 8 wherein the mixture is heated for from 1 hour to 2 hours.

11. A process according to claim 9 wherein the mixture is heated for from 1 hour to 2 hours.

12. A process according to claim 7 wherein the treated product is dried to a dry matter content on the order of 80%.

* * * * *